US009409082B2

(12) United States Patent
Hazama

(10) Patent No.: US 9,409,082 B2
(45) Date of Patent: Aug. 9, 2016

(54) APPARATUS AND MEDIUM FOR CONTROLLING A RHYTHM GAME WITH AN EDITING FUNCTION

(71) Applicant: KABUSHIKI KAISHA SQUARE ENIX, Tokyo (JP)

(72) Inventor: Ichiro Hazama, Tokyo (JP)

(73) Assignee: KABUSHIKI KAISHA SQUARE ENIX, Tokyo (JP)

(*) Notice: Subject to any disclaimer, the term of this patent is extended or adjusted under 35 U.S.C. 154(b) by 214 days.

(21) Appl. No.: 14/083,735

(22) Filed: Nov. 19, 2013

(65) Prior Publication Data
US 2014/0155157 A1 Jun. 5, 2014

(30) Foreign Application Priority Data

Nov. 30, 2012 (JP) .................................. 2012-262033

(51) Int. Cl.
*A63F 13/00* (2014.01)
*A63F 13/814* (2014.01)
*A63F 13/533* (2014.01)
*A63F 13/63* (2014.01)

(52) U.S. Cl.
CPC .............. *A63F 13/00* (2013.01); *A63F 13/533* (2014.09); *A63F 13/63* (2014.09); *A63F 13/814* (2014.09)

(58) Field of Classification Search
CPC ....... A63F 13/06; A63F 13/005; A63F 13/60; A63F 13/63; A63F 13/65; A63F 13/814
See application file for complete search history.

(56) References Cited

U.S. PATENT DOCUMENTS 6,450,888 B1  9/2002  Takase et al.
6,699,123 B2*  3/2004  Matsuura ................ A63F 13/10
                                          463/1

(Continued)

FOREIGN PATENT DOCUMENTS

JP  2000-300838  10/2000
JP  2010-088684  4/2010

(Continued)

OTHER PUBLICATIONS

"REAPER", [dated Nov. 24, 2012]. From Wikipedia, The Free Encylopedia. [online], [retrieved on Sep. 19, 2015]. Retrieved from the Internet <URL:https://en.wikipedia.org/w/index.php?title=REAPER&oldid=524649898>. 3 pages.*

(Continued)

*Primary Examiner* — Lawrence Galka
(74) *Attorney, Agent, or Firm* — Greenblum & Bernstein, P.L.C.

(57) ABSTRACT

A rhythm game control apparatus for controlling progress of a rhythm game is provided. Basic music score information indicating a basic music score on which a trigger arrangement permissible mark is arranged and music score information indicating a music score are stored. A display device is caused to display a music score editing screen on which the basic music score can be edited. The trigger is arranged on the basic music score in accordance with a trigger arranging request received from a player when an arranging request position of the trigger by the trigger arranging request is an arrangement permissible position at which a trigger arrangement permissible mark is arranged. The music score information is registered in the music score information memory indicating the music score for which the trigger is arranged on the basic music score and the basic music score is thereby edited.

4 Claims, 12 Drawing Sheets

(56) References Cited

U.S. PATENT DOCUMENTS

2009/0165632 A1* 7/2009 Rigopulos ............... A63F 13/00 84/609
2010/0088604 A1 4/2010 Miura et al.

FOREIGN PATENT DOCUMENTS

| JP | 2010-088685 | 4/2010 |
| JP | 2010-154996 | 7/2010 |
| JP | 5185425 | 4/2013 |

OTHER PUBLICATIONS

"Rock Band Network", [dated Oct. 6, 2012]. From Wikipedia, The Free Encylopedia. [online], [retrieved on Sep. 19, 2015]. Retrieved from the Internet <URL:https://en.wikipedia.org/w/index.php?title=Rock_Band_Network&oldid=516333397>. 7 pages.*

"How to Create a Song in Rock Band Network", [dated Aug. 27, 2009], From wired.com. [online], [retrieved Sep. 19, 2015]. Retrieved from the Internet <URL:http://www.wired.com/2009/08/rock-band-network-2/>. 10 pages.*

"Rock Band Network Charting Tutorial Part 2—Charting", [dated 2010]. [online], [retrieved Sep. 19, 2015]. Retrieved from the Internet <URL:https://www.youtube.com/watch?v=j4jH_aU8NYs>. 1 page.*

Office Action from Japan Patent Office (JPO) in Japanese Patent Application No. 2012-262033, dated Feb. 18, 2014, along with an English language translation thereof.

* cited by examiner

EDIT MODE INFORMATION

| EDIT TARGET | GUIDE DISPLAY TARGET | EDIT MENU INFORMATION | ... |
|---|---|---|---|
| BASIC MUSIC SCORE A | MUSIC SCORE A (BASIC) | Edit menu 1 is displayed in a case where a trigger is selected. Edit menu 2 is displayed in a case where ahold trigger is selected. | ... |
| | | | ... |
| | | | ... |

Fig .4

BASIC MUSIC SCORE INFORMATION

| BASIC MUSIC SCORE NAME | MUSIC INFORMATION | TRIGGER ARRANGEMENT PERMISSIBLE MARK INFORMATION | ... |
|---|---|---|---|
| BASIC MUSIC SCORE A | ..... | ..... | ... |
| BASIC MUSIC SCORE B | ..... | ..... | ... |
| ⋮ | ⋮ | ⋮ | ⋮ |

Fig. 5

MUSIC SCORE INFORMATION

| BASIC MUSIC SCORE NAME | DEFAULT MUSIC SCORE INFORMATION | | | EDITED MUSIC SCORE INFORMATION | | |
|---|---|---|---|---|---|---|
| | DEFAULT MUSIC SCORE NAME | TRIGGER INFORMATION | ... | EDITED MUSIC SCORE NAME | TRIGGER INFORMATION | ... |
| BASIC MUSIC SCORE A | MUSIC SCORE A (BASIC) | ...... | ... | MUSIC SCORE A-1 | ...... | ... |
| | MUSIC SCORE A (EXPERT) | ...... | ... | — | | ... |
| | MUSIC SCORE A (ULTIMATE) | ...... | ... | | | |
| BASIC MUSIC SCORE B | MUSIC SCORE B (BASIC) | ...... | ... | | | |
| | MUSIC SCORE B (EXPERT) | ...... | ... | | | |
| | MUSIC SCORE B (ULTIMATE) | | | | | |
| ... | ... | ... | ... | ... | ... | ... |

APPARATUS AND MEDIUM FOR CONTROLLING A RHYTHM GAME WITH AN EDITING FUNCTION

CROSS-REFERENCE TO RELATED APPLICATION

The present application relates to subject matter contained in Japanese Patent Application No. 2012-262033, filed on Nov. 30, 2012, the disclosure of which is expressly incorporated herein by reference in its entirety.

BACKGROUND OF THE INVENTION

1. Field of the Invention

The present invention relates to a technique for controlling progress of a rhythm game.

2. Description of the Related Art

Heretofore, in a music game (or a rhythm game) system, various ones are proposed in each of which an instruction mark set up to a non-display state is switched from the non-display state to a display state in accordance with the play content by a player (for example, see Japanese Patent Application Publication No. 2010-088684 and Japanese Patent Application Publication No. 2010-088685). Such a system places an emphasis on realization of operability with high interest using a music score (that is, an image that shows input timing of an operation sign in accordance with music) created in advance by a provider of the game system or the like.

However, in these conventional systems, there has been a problem that a player cannot utilize only a music score, which has been created in advance at a game provider side, in a music game and it is thereby impossible to satisfy needs of the player who wants to utilize a variety of music scores.

SUMMARY OF THE INVENTION

The present invention has been made in order to solve the problem described above, and it is an object of the present invention to cause a player to create a variety of music scores in a rhythm game.

In order to achieve the above object, the present invention is directed to a rhythm game control apparatus for controlling progress of a rhythm game while reproducing music and causing a display device to display one or more trigger on a display screen of the display device. In this case, the display device includes a touch panel, and each of the one or more trigger indicates an operation sign to prompt a player to input an operation according to a rhythm of the music. The rhythm game control apparatus according to the present invention includes a basic music score information memory for storing basic music score information, the basic music score information indicating a basic music score on which one or more trigger arrangement permissible mark is arranged, the trigger arrangement permissible mark indicating an arrangement permissible position for the one or more trigger.

The rhythm game control apparatus also includes a music score information memory for storing music score information, the music score information indicating a music score on which the one or more trigger is arranged, the music score being used in the rhythm game.

The rhythm game control apparatus also includes a music score editing screen display controller for causing the display device to display a music score editing screen on which the basic music score indicated by the basic music score information can be edited.

The rhythm game control apparatus also includes a trigger arranging request receiver for receiving a trigger arranging request from the player on the music score editing screen on the basis of a trigger arranging operation by the player.

The rhythm game control apparatus also includes a trigger arranger for arranging each of the one or more trigger on the basic music score in accordance with the trigger arranging request received by the trigger arranging request receiver in a case where an arranging request position of each trigger by the trigger arranging request is an arrangement permissible position at which a trigger arrangement permissible mark is arranged.

The rhythm game control apparatus also includes an edited music score information register for registering the music score information in the music score information memory, the music score information indicating the music score for which the trigger arranger arranges the one or more trigger on the basic music score and the basic music score is thereby edited.

By configuring the rhythm game control apparatus as described above, it becomes possible to cause a player to create a variety of music scores in a rhythm game.

In the rhythm game control apparatus according to the present invention, it is preferable that the music score editing screen display controller causes the display device to display the music score editing screen on which the music score indicated by the music score information registered in the music score information memory can be edited, wherein the trigger arranger arranges a trigger on the music score in response to the trigger arranging request in a case where the arranging request position of the trigger by the trigger arranging request is an arrangement permissible position at which a trigger arrangement permissible mark is arranged, and wherein the edited music score information register registers the music score information, which indicates the music score edited so that the trigger arranger arranges the trigger on the music score, in the music score information memory.

In the rhythm game control apparatus according to the present invention, it is preferable that the rhythm game control apparatus further includes: a trigger arrangement changing request receiver for receiving a trigger arrangement changing request on the music score editing screen by a trigger arrangement changing operation of the player; and a trigger arrangement position changer for changing the arrangement position of the trigger in accordance with the trigger arrangement changing request in a case where the arrangement changing request position of the trigger by the trigger arrangement changing request is another arrangement permissible position at which another trigger arrangement permissible mark is arranged. In this case, the edited music score information register registers the music score information, which indicates the music score edited so that the trigger arrangement position changer changes the arrangement position of the trigger, in the music score information memory.

In the rhythm game control apparatus according to the present invention, it is preferable that the music score editing screen display controller causes the display device to selectively display the one or more trigger arrangement permissible mark on the basis of a size of the music score editing screen to be displayed on the display screen.

Moreover, in another aspect of the present invention, the present invention is directed to a non-transitory computer-readable medium containing a rhythm game control program for causing a computer to control progress of a rhythm game while reproducing music and causing a display device to display one or more trigger on a display screen of the display device, the display device including a touch panel. In this case, each of the one or more trigger indicates an operation sign to prompt a player to input an operation according to a rhythm of the music. The computer includes a basic music score information memory for storing basic music score information, the basic music score information indicating a basic music score on which one or more trigger arrangement permissible mark is arranged, the trigger arrangement permissible mark indicating an arrangement permissible position for the one or more trigger; and a music score information memory for storing music score information, the music score information indicating a music score on which the one or more trigger is arranged, the music score being used in the rhythm game.

The rhythm game control program causes the computer to execute steps including causing the display device to display a music score editing screen on which the basic music score indicated by the basic music score information can be edited.

The steps also include receiving a trigger arranging request from the player on the music score editing screen on the basis of a trigger arranging operation by the player.

The steps also include arranging each of the one or more trigger on the basic music score in accordance with the trigger arranging request received in the receiving a trigger arranging request in a case where an arranging request position of each trigger by the trigger arranging request is an arrangement permissible position at which a trigger arrangement permissible mark is arranged.

The steps also include registering the music score information in the music score information memory, the music score information indicating the music score for which the one or more trigger is arranged on the basic music score and the basic music score is thereby edited.

According to the present invention, it is possible to cause a player to create a variety of music scores in a rhythm game.

BRIEF DESCRIPTION OF THE DRAWINGS

The foregoing and other objects, features and advantages of the present invention will become more readily apparent from the following detailed description of a preferred embodiment of the present invention that proceeds with reference to the appending drawings:

FIG. 4 is an explanatory drawing showing an example of a storage state of basic music score information;

FIG. 5 is an explanatory drawing showing an example of a storage state of music score information;

DETAILED DESCRIPTION OF THE INVENTION

Hereinafter, an example of one embodiment of the present invention will be described with reference to the appending drawings.

Figure 1:
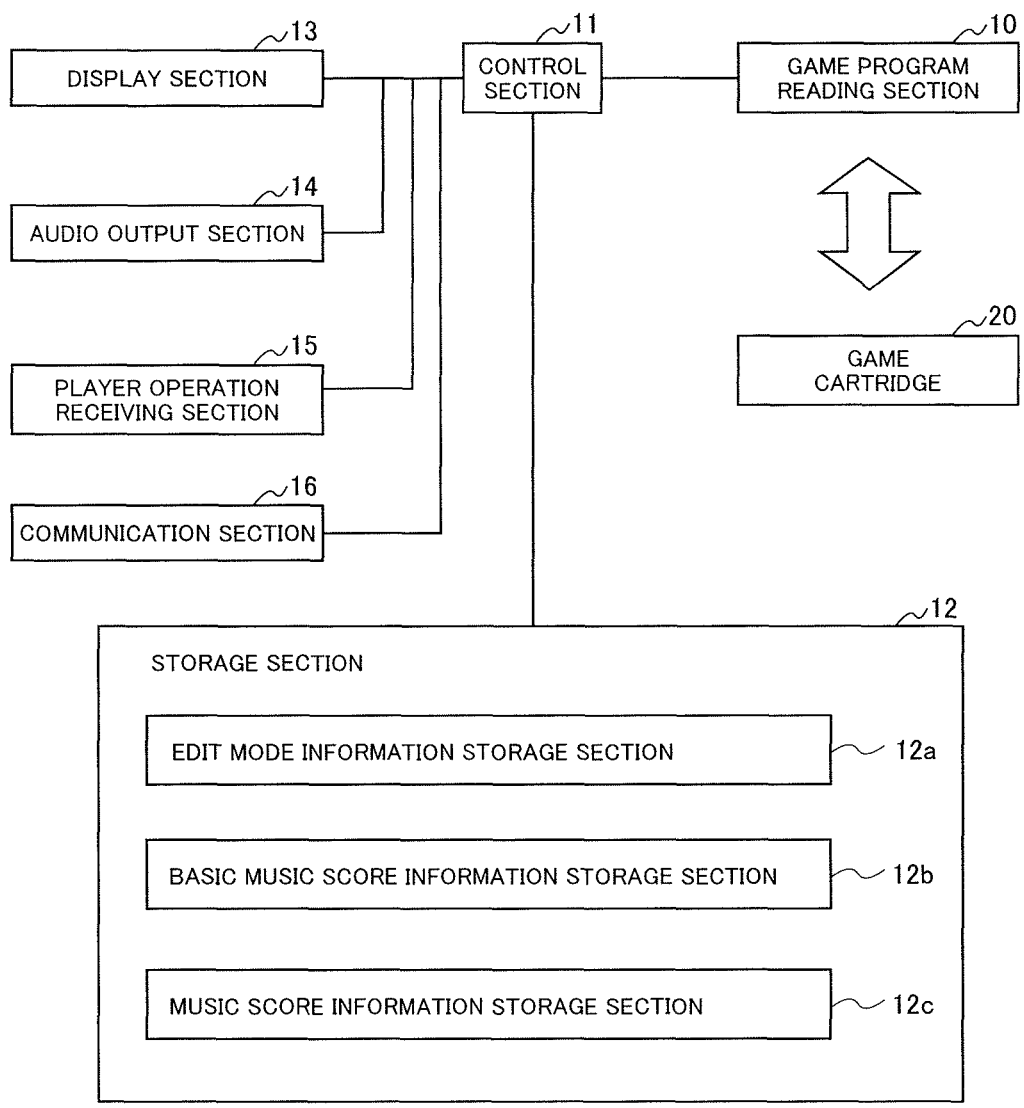
FIG. 1 is a block diagram showing a configuration example of a rhythm game control apparatus.

FIG. 1 is a block diagram showing a configuration example of a rhythm game control apparatus 100 according to one embodiment of the present invention. As shown in FIG. 1, the rhythm game control apparatus 100 includes: a game program reading section 10; a control section 11; a storage section 12; a display section 13; an audio output section 14; a player operation receiving section 15; and a communication section 16.

The game program reading section 10 has a function to read out a necessary video game program from a storage medium in which a storage medium is embedded. Various kinds of video game programs are stored in the storage medium. In this regard, in the present embodiment, the game program reading section 10 has amounting section into which a game cartridge 20, in which the video game program is stored, is detachably mounted. A player (that is, an operator (user) of the rhythm game control apparatus 100) reads out a video game program from a storage medium of a game cartridge 20 that is mounted into the mounting section, and stores the read-out video game program in the storage section 12. In this regard, the video game carried out in accordance with the video game program used in the present embodiment may be any one such as a RPG, a simulation game, a puzzle game, a battle game and the like, so long as the video game is a video game that contains a rhythm game as an element of the video game.

The control section 11 has a function to execute a video game program read out by the game program reading section 10 and stored in the storage section 12, and a function to carry out various kinds of controls to cause the video game to proceed in response to an operation of the player.

Figures 2, 3:
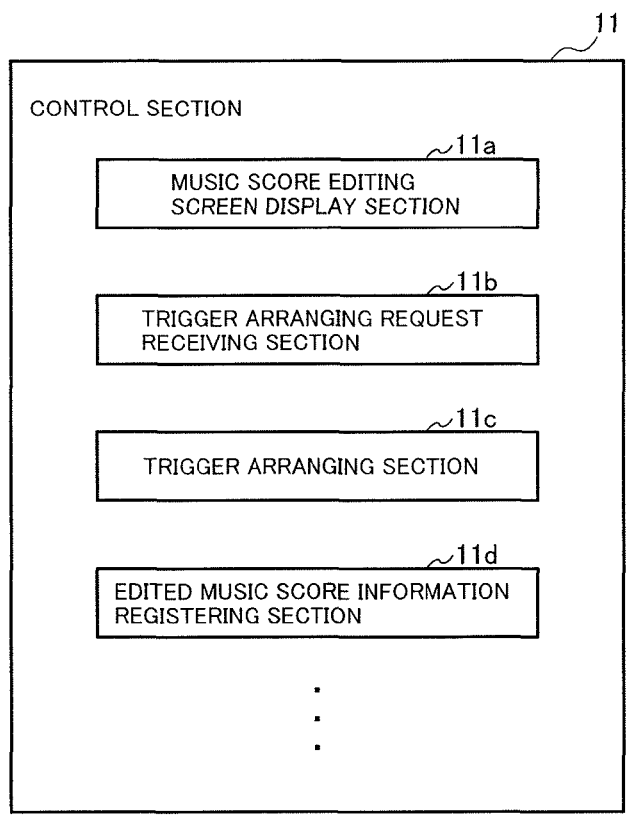
FIG. 2 is an explanatory drawing for explaining an example of a configuration of a control section.
FIG. 3 is an explanatory drawing showing an example of a storage state of edit mode information.

FIG. 2 is an explanatory drawing for explaining an example of a configuration of the control section 11 according to the present embodiment. As shown in FIG. 2, the control section 11 includes: a music score editing screen display section 11a; a trigger arranging request receiving section 11b; a trigger arranging section 11c; and an edited music score information registering section 11d.

The music score editing screen display section 11a has a function to carry out a process to cause the display section 13 to display a music score editing screen. A basic music score indicated by basic music score information (will be described later) can be edited on the music score editing screen.

The trigger arranging request receiving section 11b has a function to carry out a process to receive a trigger arranging request by a trigger arranging operation of the player on the music score editing screen.

The trigger arranging section 11c has a function to carry out a process to arrange triggers on a basic music score in accordance with a trigger arranging request in a case where an arranging request position of a trigger according to a trigger arranging request is an arrangement permissible position at which a trigger arrangement permissible mark is arranged.

The edited music score information registering section 11d has a function to carryout a process to register music score information, which indicates a music score in which a basic music score is edited, in the music score information storage section 12c in a case where the trigger arranging section 11c arranges a trigger at the basic music score.

The storage section 12 is a storage medium for storing video game programs and various kinds of data that are necessary when the video game is caused to proceed. The storage section 12 is configured by a nonvolatile memory such as a RAM, for example. In the storage section 12, various kinds of information registered and updated in accordance with progress of the video game, and various kinds of information used in the video game, which are read out from the storage medium embedded into the game cartridge 20, are stored.

In this regard, the rhythm game control apparatus 100 may be configured so that the video game program is downloaded from a video game program providing server (not shown in the drawings) via a communication network such as the Internet or the like and is stored in the storage section 12.

In the present embodiment, the storage section 12 includes: an edit mode information storage section 12a; a basic music score information storage section 12b; and a music score information storage section 12c.

The edit mode information storage section 12a is a storage medium for storing edit mode information. The edit mode information is information on a mode to edit a music score used in the rhythm game (edit mode).

FIG. 3 is an explanatory drawing showing an example of a storage state of the edit mode information stored in the edit mode information storage section 12a. As shown in FIG. 3, the edit mode information contains: an edit target; a guide display target; and edit menu information. In this regard, although it is not shown in the drawings, in the present embodiment, information indicating a screen and an image to be displayed in an edit mode is contained in the edit mode information storage section 12a.

Here, the edit target denotes a music score that becomes a target in the edit mode. The target indicates the music score for which arrangement of triggers is to be edited. In the present embodiment, any one of a basic music score that is a music score on which no trigger is arranged and a music score on which the trigger has already been arranged (in the present embodiment, a default music score or an edited music score) is set up as an edit target. Further, the trigger means an operation sign to prompt the player to carry out a predetermined operational input in the rhythm game.

Further, the guide display target means a target that is displayed for guiding an example of an arrangement position of the trigger in the edit mode (that is, a target to be displayed for guidance). In the present embodiment, for the guide display target, any one of three types of music scores (default music score), including basic, expert and ultimate, created in advance in correspondence with the basic music score is set up as the default music score.

Further, the edit menu information is information on the edit menu displayed in the edit mode. In the present embodiment, the edit menu information contains image information to be displayed as an edit menu and the like in addition to rules to show an edit menu to be displayed in accordance with a trigger selected in the edit mode. Hereinafter, the case where a rule that "An edit menu 1 is displayed in a case where a trigger is selected; or an edit menu 2 (which is different from the edit menu 1) is displayed in a case where a hold trigger is selected" is set up as the rules to show the edit menu will be described as examples.

The basic music score information storage section 12b is a storage medium for storing basic music score information. The basic music score information indicates a basic music score on which a trigger arrangement permissible mark is arranged. The trigger arrangement permissible mark indicates an arrangement permissible position of a trigger.

FIG. 4 is an explanatory drawing showing an example of a storage state of the basic music score information stored in the basic music score information storage section 12b. As shown in FIG. 4, the basic music score information contains: a basic music score name; music information; and trigger arrangement permissible mark information.

Here, the basic music score name means a name used as identification information for uniquely identifying (or specifying) a basic music score.

Further, the music information is information for indicating music to be reproduced during the rhythm game.

Further, the trigger arrangement permissible mark information is information on a trigger arrangement permissible mark that indicates an arrangement permissible position of a trigger on a music score. In the present embodiment, positions to arrange triggers are defined for each basic music score. In this regard, it is preferable that the trigger arrangement permissible position is defined on the basis of a tempo of music corresponding to the basic music score.

The music score information storage section 12c is a storage medium for storing music score information. The music score information indicates a music score used in the rhythm game. The trigger is arranged on the music score.

FIG. 5 is an explanatory drawing showing an example of a storage state of the music score information stored in the music score information storage section 12c. As shown in FIG. 5, the music score information contains: a basic music score name; default music score information; and edited music score information.

Here, the default music score information means information on a music score on which a trigger is arranged in advance by a creator of the rhythm game or the like, for example. In the present embodiment, the default music score information contains: a default music score name used as identification information for uniquely identifying the default music score; and trigger information that is information on the arranged trigger(s).

Further, the edited music score information means information on a music score that has been edited by a player. Here, the word "to edit a music score" in the present embodiment means to arrange a trigger or triggers on a trigger arrangement permissible mark(s) that is/are arranged on a music score, or to delete the trigger arranged on the trigger arrangement permissible mark that is/are arranged on the music score or to change the type and/or a position of the trigger. In the present embodiment, the edited music score information contains: an edited music score name used as identification information for uniquely identifying the edited music score; and trigger information that is information on the edited trigger. In this regard, the rhythm game control apparatus 100 may be configured so that the edited music score name is set up by an editor of the music score, or created one is automatically set up as the edited music score name after editing in accordance with a predetermined rule.

The display section 13 is a display device for displaying the game screen in response to progress of the video game and operations by the player in accordance with controls by the control section 11. The display section 13 is constructed by a liquid crystal display, for example.

The audio output section 14 outputs audio in response to operations by the player and progress of the video game in accordance with a control by the control section 11.

The player operation receiving section 15 is configured so as to receive operational signals in response to operations by the player, and to notify the control section 11 of that result. In the present embodiment, the player operation receiving section 15 is configured so as to receive an operation of the player via a touch panel provided in the display section 13. In this regard, the rhythm game control apparatus 100 may be configured so that the player operation receiving section 15 receives an operation of the player via a controller such as a mouse and a game pad.

The communication section 16 causes the rhythm game control apparatus 100 to connect to a communication network such as the Internet by wireless or wired connections, and to transmit and receive various kinds of information.

Next, an outline of the rhythm game carried out in the rhythm game control apparatus 100 according to the present embodiment will be described. The rhythm game carried out in the present embodiment includes: a game mode in which a player carries out a predetermined operation in tune with music to cause the rhythm game to proceed; and an edit mode in which the player carries out editing a music score.

In the game mode, a trigger that is an operation sign is displayed on the display screen on the basis of the music score information, and the player carries out an operation indicated by the trigger in accordance with timing when the trigger reaches a specific position on the display screen. Then, the rhythm game is caused to proceed while sequentially determining the content and the timing of the operation carried out by the player. In this regard, a method of causing the rhythm game to proceed is not particularly limited. In the present embodiment, a progress method in which an attack toward an enemy character is carried out when it is determined that the operation of the player succeeded and a progress method in which a player character moves in a virtual space (field) when it is determined that the operation of the player succeeded are adopted.

On the other hand, in the edit mode, a screen for arranging the trigger according to the music is displayed on the display screen, and the player creates a music score by carrying out addition or arrangement changing of the trigger and the like. The edit mode will be described later in detail.

Next, an operation of the rhythm game control apparatus 100 according to the present embodiment will be described.

Figure 6:
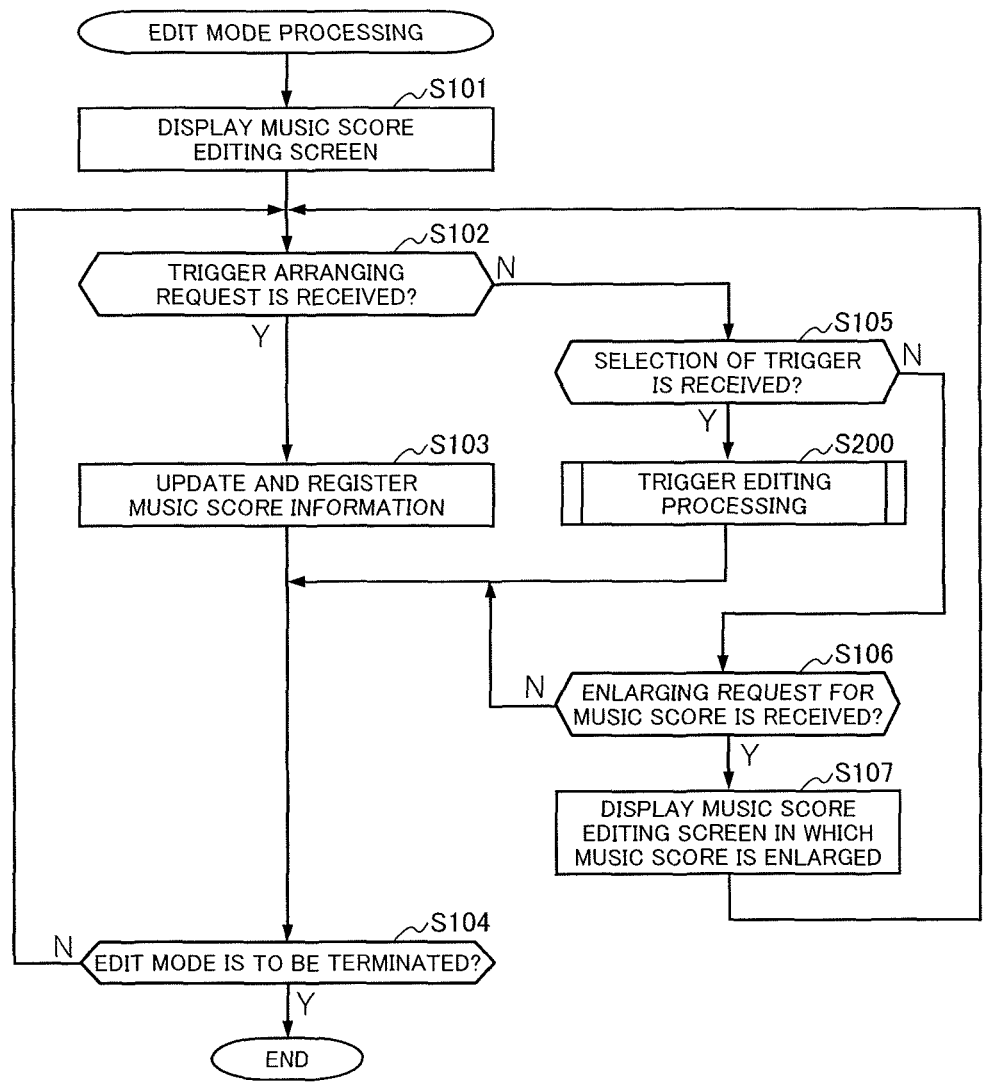
FIG. 6 is a flowchart showing an example of edit mode processing.

FIG. 6 is a flowchart showing an example of edit mode processing carried out by the rhythm game control apparatus 100. In the edit mode processing, processing to edit a music score (in particular, addition, deletion or change of a trigger) is carried out in response to an instruction from the player. In this regard, the content of processing with no relationship to the present invention may be omitted.

The edit mode processing is started when a request to start an edit mode from the player and selection of a music score as an edit target (that is, a music score on which a basic music score or a trigger is arranged) are received, for example.

In the edit mode processing, the control section 11 first causes the display section 13 to display a music score editing screen (Step S101). An edit target for which selection is received can be edited on the music score editing screen. In the present embodiment, the case where the control section 11 receives selection of a basic music score A and a music score editing screen on which a music score A-1 can be edited is thereby displayed will be described as an example. The music score A-1 is a music score on which a trigger has already been arranged. In this regard, the rhythm game control apparatus 100 may be configured so that the control section 11 causes the display section 13 to display the music score editing screen without specifying an edit target and then receives selection of an edit target by the player.

Figure 7:
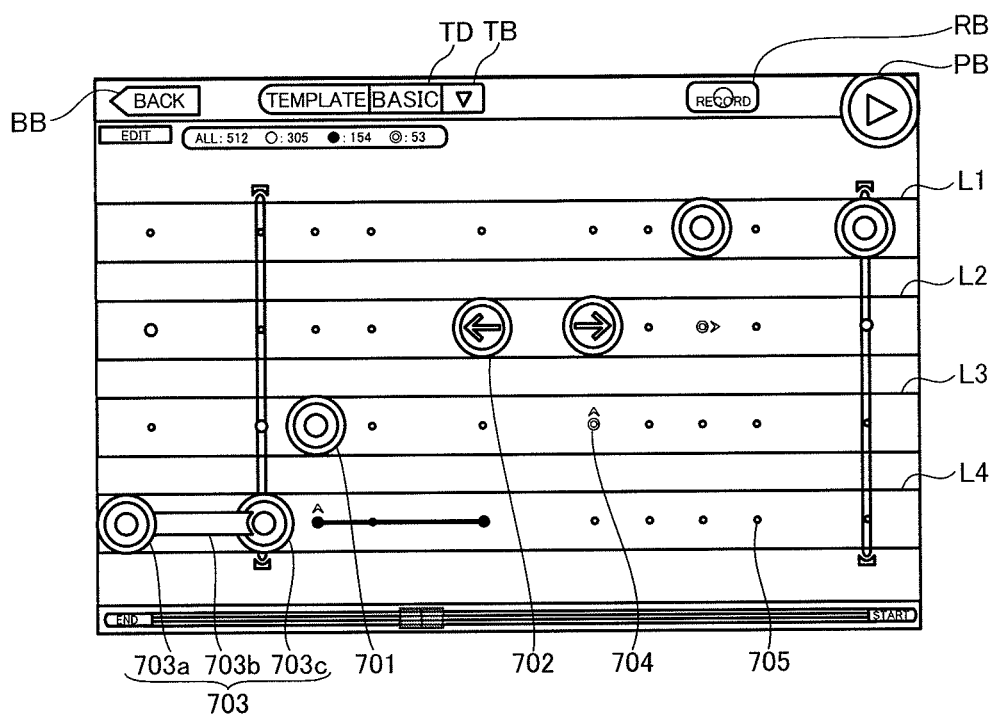
FIG. 7 is an explanatory drawing for explaining an example of a music score editing screen.

FIG. 7 is an explanatory drawing for explaining an example of the music score editing screen. As shown in FIG. 7, a music score configured by four lanes L1 to L4, a back button BB, a template display region TD, a template change button TB, a record button RB and a play button PB are provided on the music score editing screen.

Trigger(s), trigger arrangement permissible marks and guide (s) are displayed on each lane on the basis of music score information corresponding to the music score A-1 and basic music score information corresponding to the basic music score A that is a basic music score of the music score A-1.

Here, types of the trigger according to the present embodiment will be described briefly. There are four types in the trigger according to the present embodiment that include a tap trigger, a slide trigger, a hold trigger and a hold slide trigger.

The tap trigger (for example, a trigger 701 shown in FIG. 7) functions as an operation sign that indicates a tap operation to an arbitrary position on the music score editing screen. The slide trigger (for example, a trigger 702 shown in FIG. 7) functions as an operation sign that indicates a slide operation toward the direction of an arrow drawn in the slide trigger. The hold trigger (for example, a trigger 703 shown in FIG. 7) is a trigger constructed by a starting point trigger 703*a*, a hold line 703*b* and an ending point trigger 703*c*. The hold trigger functions as an operation sign that indicates continuation of an operation shown by the starting point trigger 703*a* during a length of a hold line. The hold slide trigger (not shown in the drawings) is a trigger that has a configuration so that the starting point trigger 703*a* of the hold trigger 703 is replaced by a slide trigger. The hold slide trigger functions as an operation sign that indicates continuation of an operation shown by a slide trigger as a starting point trigger during a length of a hold line.

Further, each of trigger arrangement permissible marks (for example, a trigger arrangement permissible mark 705 shown in FIG. 7) is arranged at the timing along with a rhythm of music indicated by the music information of the music score A-1, and the player (that is, an editor of the music score) arranges triggers on the trigger arrangement permissible marks.

Further, a guide is displayed in accordance with default music score information corresponding to the music score A-1. More specifically, a predetermined image is displayed at the position of the trigger indicated by the default music score information in the form different from that of the trigger set up on the music score A-1. In the present embodiment, the type of the music score indicated by the default music score information is displayed in the template display region TD. Further, the default music score information is changed by the template change button TB.

Further, in the present embodiment, in a case where selection of the back button BB is received, the control section 11 terminates the edit mode.

Further, in a case where selection of the record button RB is received, the control section 11 starts processing to carry out a real-time input mode that is a mode to arrange trigger(s) on the scene while reproducing (or performing) the music (not shown in the drawings). In the real-time input mode, the control section 11 starts to perform the music, and carries out recording of the trigger at the same time. At this time, the control section 11 causes the display section 13 to display an image that indicates a region to request the player to input an operation for the trigger on the music score, and feeds the trigger arrangement permissible marks in accordance with the performance of the music, whereby the player can be caused to arrange the triggers with a feeling similar to that during the game play.

Moreover, in a case where selection of the play button PB is received, the control section 11 starts processing to carry out an auto play mode that is a mode in which the trigger (s) that is currently arranged can be confirmed by automatic reproduction (not shown in the drawings). In the auto play mode, the control section 11 starts to perform the music according to the music score displayed on the music score editing screen when the selection of the play button PB is received, and outputs a sound effect when the operation indicated by the trigger arranged on the music score is inputted at the "best timing (critical)" for the game mode.

When the music score editing screen is displayed, the control section 11 determines whether an arranging request of a trigger (trigger arranging request) is received or not (Step S102).

Figure 8:
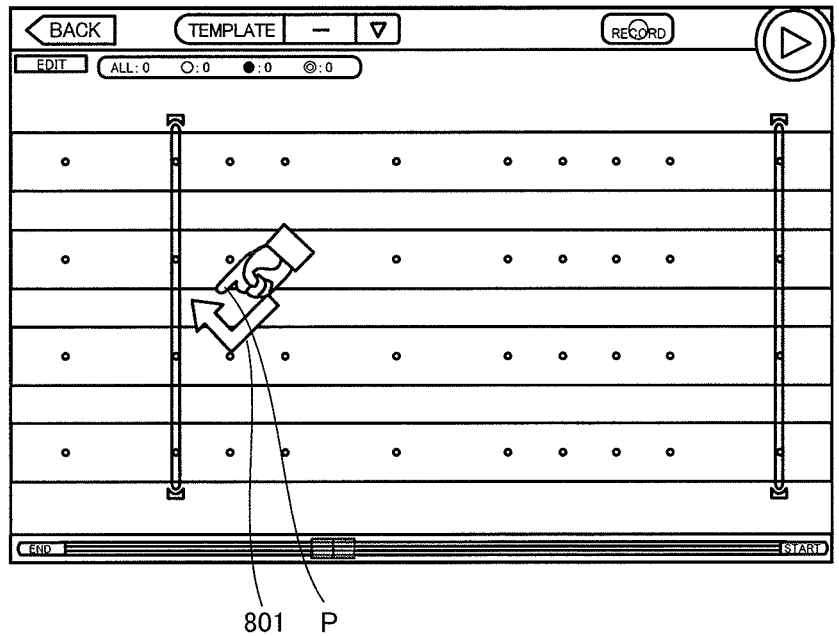
FIGS. 8A and 8B are explanatory drawing for explaining an arranging request of a trigger.
Figure 8:
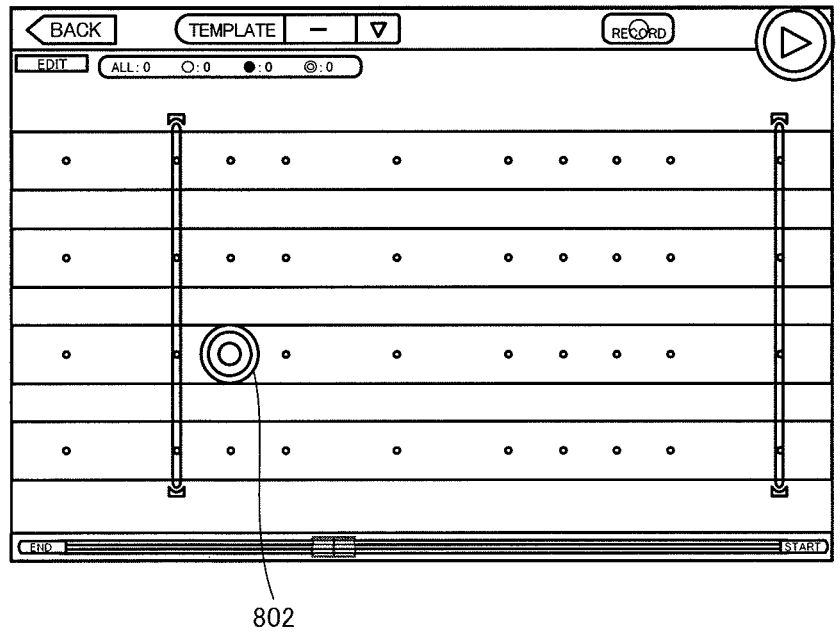

FIGS. 8A and 8B are explanatory drawing for explaining an arranging request of a trigger. When a trigger arrangement permissible mark 801 on a music score is tapped by a finger P of the player as shown in FIG. 8A, the control section 11 determines that an arranging request for the trigger to the trigger arrangement permissible mark 801 is received. In this regard, in the present embodiment, even though the player carries out arrangement of the trigger by a somewhat rough operation, the control section 11 snaps the trigger on the trigger arrangement permissible mark. Namely, for example, even in a case where the player touches a position away from the trigger arrangement permissible mark 801 by a predetermined distance, the control section 11 determines that a trigger arranging request to the trigger arrangement permissible mark 801 is received if there is no trigger arrangement permissible mark other than the trigger arrangement permissible mark 801 at the touched position. By configuring the rhythm game control apparatus 100 in this manner, the player is allowed to create a music score consistent with a rhythm of music corresponding to a music score even though the player arranges triggers without caring about strict timing and/or a strict position.

Ina case where it is determined that the trigger arranging request is received ("Yes" at Step S102), the control section 11 updates the music score information in accordance with the received trigger arranging request (Step S103). In the present embodiment, the control section 11 arranges a tap trigger 802 on the music score A-1 as shown in FIG. 8B in a case where the arranging request position of the trigger by the trigger arranging request is an arrangement permissible position at which the trigger arrangement permissible mark is arranged. On the other hand, in a case where the arranging request position of the trigger by the trigger arranging request is not the arrangement permissible position at which a trigger arrangement permissible mark is arranged, the control section 11 causes the display section 13 to display a predetermined error message, which shows that effect, on the display screen, and does not arranges any trigger. Further, in the present embodiment, whenever the music score information is updated, the control section 11 registers the updated music score information in the music score information storage section 12c. However, the rhythm game control apparatus 100 may be configured so that the control section 11 requests the player to select whether the updated music score information is registered or not and/or whether the updated music score information is overwritten or not, for example.

When the music score information is updated, the control section 11 determines whether the edit mode is to be terminated or not (Step S104). Here, in a case where it is determined that the edit mode is to be terminated, for example, because selection of the back button BB by the player is received ("Yes" at Step S104), the control section 11 terminates the processing herein.

On the other hand, in a case where it is determined that the edit mode is not to be terminated ("No" at Step S104), the control section 11 causes the display section 13 to display the music score editing screen in accordance with the updated music score information, and causes the processing flow to proceed to the process at Step S102.

Further, in a case where it is determined in the process at Step S102 that no trigger arranging request is received ("No" at Step S102), the control section 11 determines whether selection of a trigger is received or not (Step S105). Here, in a case where it is determined that selection of the trigger is received, for example, by tapping the trigger on the display screen by means of the finger P of the player ("Yes" at Step S105), the control section 11 starts trigger editing processing for causing the player to edit an arrangement position of the trigger (Step S200). In this regard, in a case where the trigger on the display screen receives a drag operation by means of the finger P of the player at this time, the control section 11 moves the trigger right and left and up and down in response to the drag operation. In a case where the trigger is moved right and left, the timing is adjusted. In a case where the trigger is moved up and down, the lane is changed into another lane.

Figure 9:
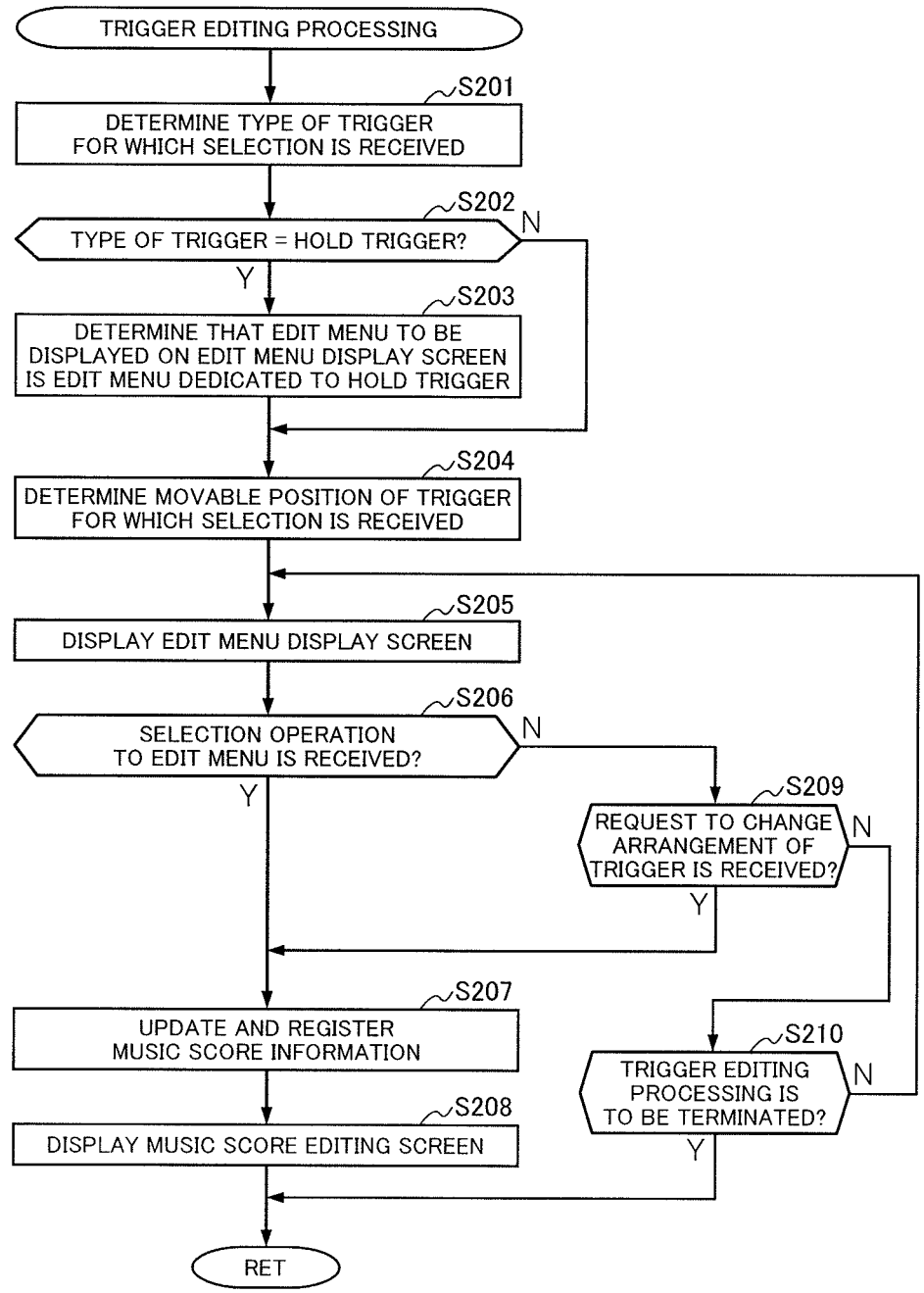
FIG. 9 is a flowchart showing an example of trigger editing processing.

FIG. 9 is a flowchart showing an example of trigger editing processing carried out by the rhythm game control apparatus 100. In this regard, the content of processing with no relationship to the present invention may be omitted.

In the trigger editing processing, the control section 11 first determines a type of a trigger for which selection is received (Step S201).

When the type of the trigger is determined, the control section 11 determines whether the type of the trigger for which the selection by the player is received is a hold trigger (including a hold slide trigger) or not (Step S202). Here, in a case where it is determined that the type of the trigger is not a hold trigger ("No" at Step S202), the control section 11 shifts to the process at Step S204 (will be described later).

On the other hand, in a case where it is determined that the type of the trigger is hold trigger ("Yes" at Step S202), the control section 11 determines that the edit menu to be displayed on the edit menu display screen is an edit menu dedicated to a hold trigger (Step S203). In this regard, in a case where the type of the trigger is not a hold trigger, the control section 11 selects normal one different from the edit menu dedicated to the hold trigger as the edit menu to be displayed on the edit menu display screen.

When the edit menu to be displayed is determined, the control section 11 determines a position to which the trigger, for which the selection is received, can be moved (that is, a movable position for the trigger) (Step S204). In the present embodiment, the trigger cannot be arranged at a position that meets a predetermined condition (for example, the same timing as other trigger, timing immediately after start of performance of the music, timing immediately before termination of performance of the music, timing to start a feature zone, and timing to terminate the feature zone). In this regard, the feature zone according to the present embodiment is a fixed range on the music score in which a special effect (for example, summons of a summon monster) is activated when the player continues the operation at the right time during progress of the game mode. The rhythm game control apparatus 100 may be configured so that the control section 11 allows the player who meets a specific condition to set up the feature zone as one mode to edit a music score.

When the position to which the trigger can be moved is determined, the control section 11 causes the display section 13 to display an edit menu display screen (Step S205).

Figure 10:
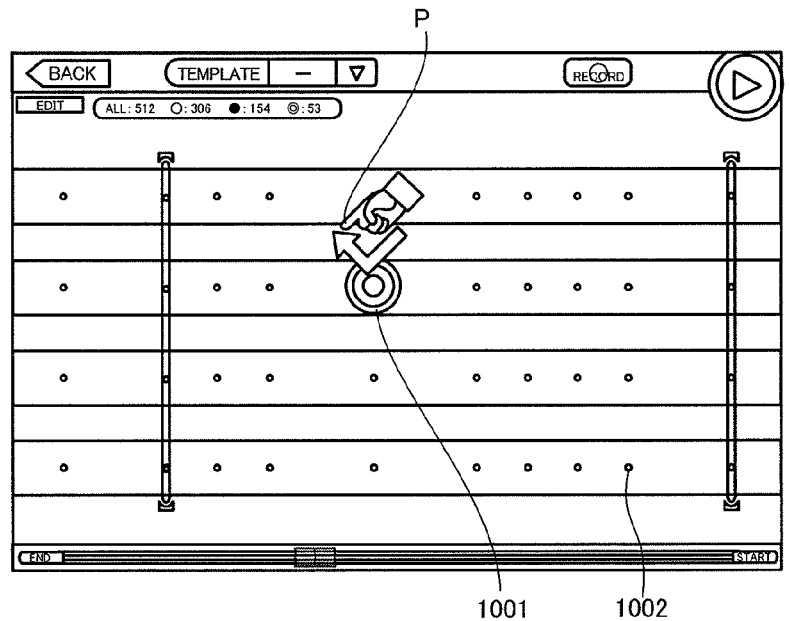
FIGS. 10A and 10B are explanatory drawings for explaining an edit menu display screen.
Figure 10:
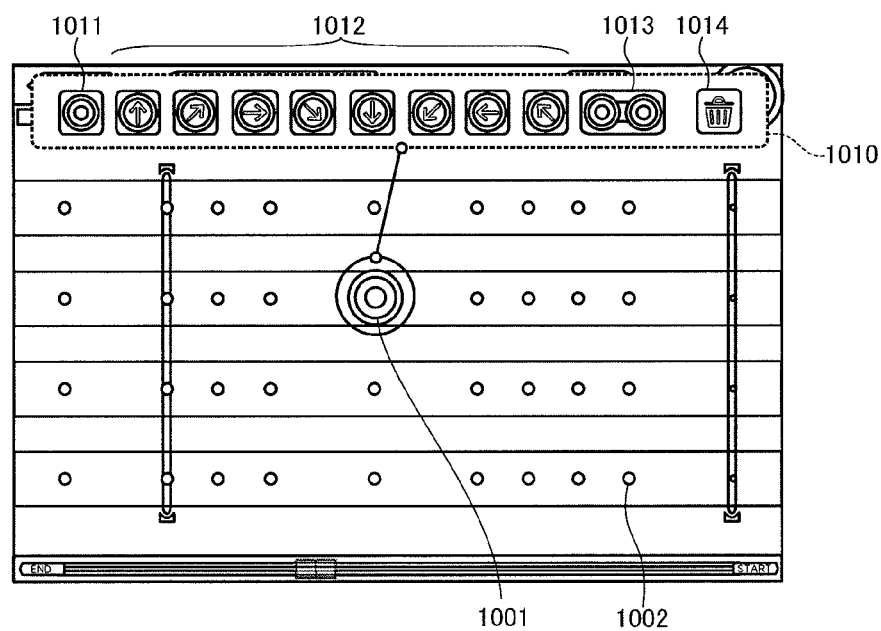

FIGS. 10A and 10B are explanatory drawings for explaining an example of an edit menu display screen. When a tap operation to a tap trigger 1001 singly displayed on the display screen by the finger P of the player is received as shown in FIG. 10A, the control section 11 causes the display section 13 to display an edit menu display screen including an edit menu 1010 as shown in FIG. 10B. The edit menu 1010 is displayed in the form associated with the tap trigger 1001. Here, in the present embodiment, a tap trigger 1011, plural kinds of slide triggers 1012, a hold trigger 1013 and a recycle bin icon 1014 are displayed in the edit menu 1010. The edit menu 1010 is connected to the tap trigger 1001 by a straight line. Then, in a case where a selection operation to the edit menu 1010 by the player is received, the control section 11 changes the tap trigger 1001. Namely, in a case where selection of a slide trigger is received, for example, the control section 11 changes the tap trigger 1001 into a slide trigger. Further, in a case where selection of the recycle bin icon 1014 is received, the control section 11 deletes the tap trigger 1001.

In this regard, as shown in FIG. 10B, the control section 11 causes the display section 13 to emphatically display the trigger arrangement permissible mark (for example, a trigger arrangement permissible mark 1002) on the edit menu display screen (more specifically, the trigger arrangement permissible mark that has never been bright until transition (or shift) to an edit menu display screen is caused to be bright whitely). Then, in a case where a drag operation by the player is received and it is determined that the received drag operation is an operation to move the tap trigger 1001 to a movable position, the control section 11 arranges the tap trigger 1001 at the movable position (not shown in the drawings).

Figure 11:
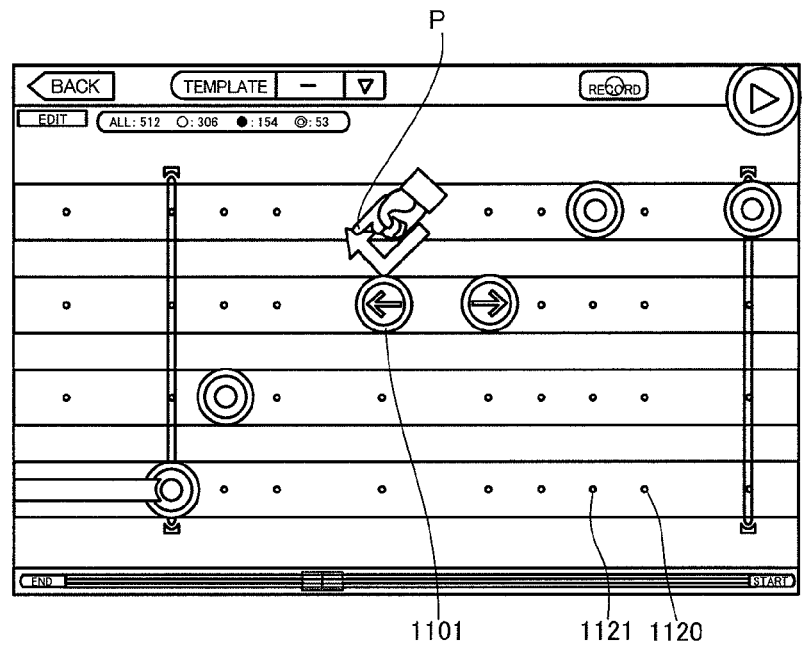
FIGS. 11A and 11B are explanatory drawings for explaining another example of an edit menu display screen.
Figure 11:
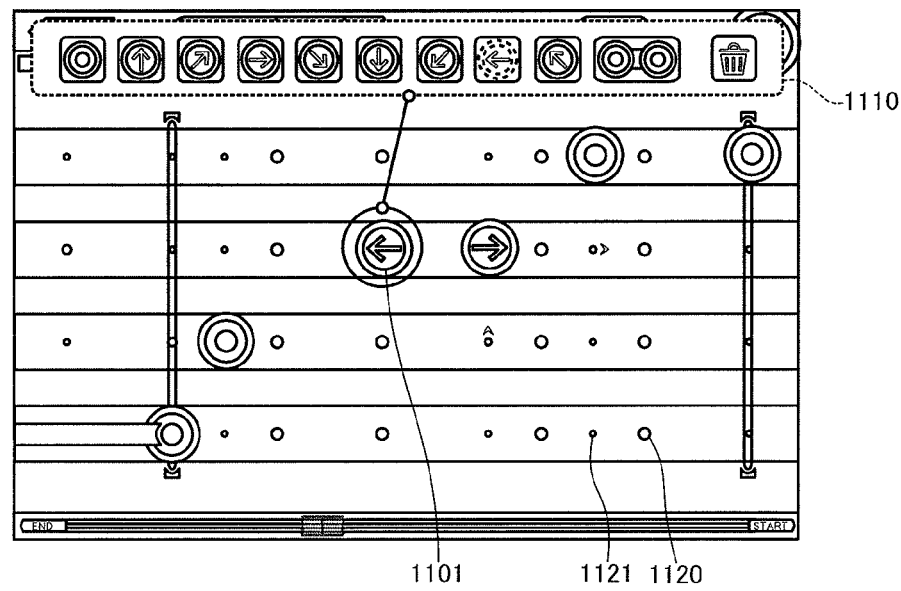

FIGS. 11A and 11B are explanatory drawings for explaining another example of an edit menu display screen. When a tap operation to a slide trigger 1101 displayed on the display screen by the finger P of the player is received in a state where a plurality of triggers are displayed on the display screen as shown in FIG. 11A, the control section 11 causes the display section 13 to display an edit menu display screen including an edit menu 1110 as shown in FIG. 11B. The edit menu 1110 is displayed in the form associated with the slide trigger. Further, in the present embodiment, the control section 11 causes the display section 13 to emphatically display only a trigger arrangement permissible mark (for example, a trigger arrangement permissible mark 1120 shown in FIG. 11B) among trigger arrangement permissible marks displayed on the music score editing screen (for example, see the two trigger arrangement permissible marks 1120, 1121 shown in FIG. 11A). The trigger arrangement permissible mark becomes a position to which the slide trigger 1101 moves.

Figure 12:
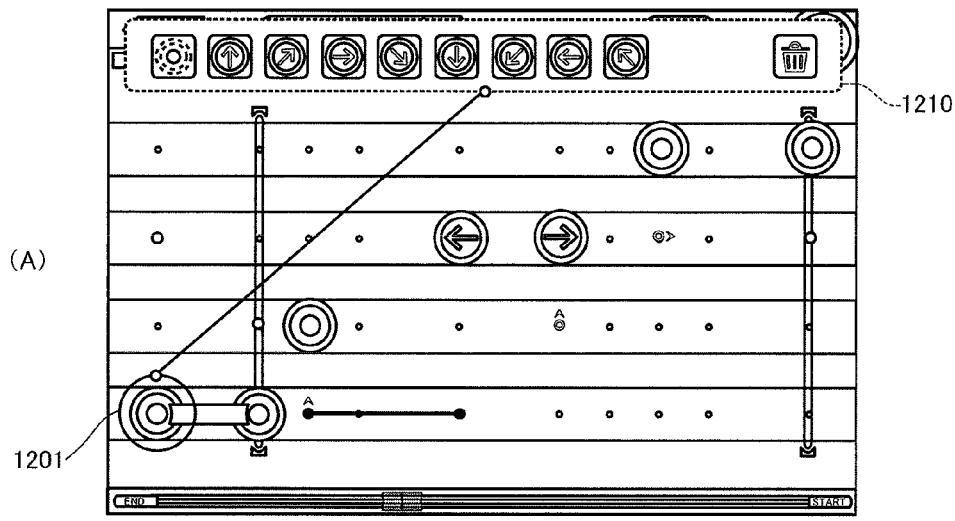
FIGS. 12A and 12B are explanatory drawings for explaining the edit menu display screen including an edit menu dedicated to a hold trigger.
Figure 12:
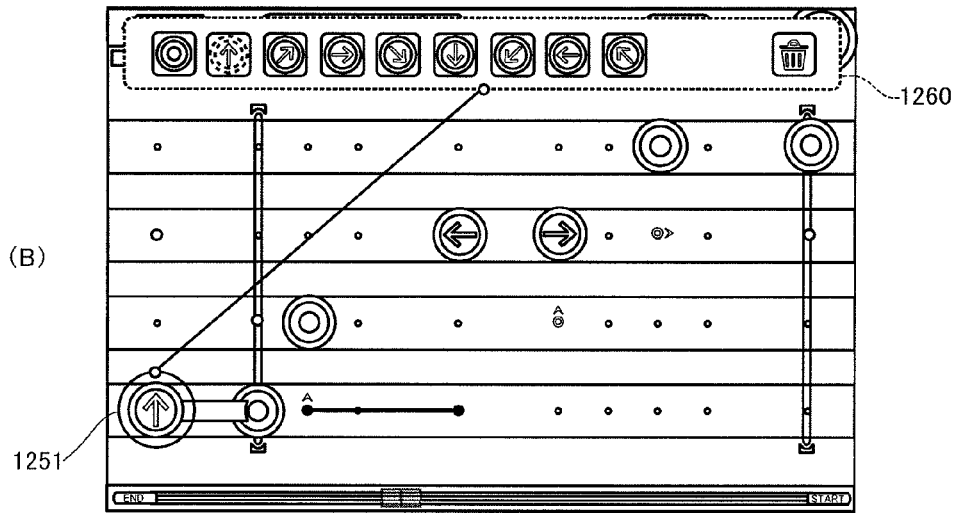

FIGS. 12A and 12B are explanatory drawings for explaining the edit menu display screen including an edit menu dedicated to a hold trigger. In a case where selection of a hold trigger by the player is received on the music score editing screen, the control section 11 causes the display section 13 to display an edit menu display screen including an edit menu 1210 as shown in FIG. 12A. The edit menu 1210 is displayed in the form associated with the hold trigger 1201. Here, in the present embodiment, a plurality of slide triggers (starting point slide triggers) for receiving a change request into a hold slide trigger is selectably displayed on the edit menu 1210 connected to the hold trigger 1201 by a straight line.

In this regard, in a case where selection of a hold slide trigger by the player is received on the music score editing screen, the control section 11 causes the display section 13 to display an edit menu display screen including an edit menu 1260 as shown in FIG. 12B. The edit menu 1260 is displayed in the form associated with a hold slide trigger 1251. Here, in the present embodiment, a plurality of slide triggers (starting point slide triggers) for receiving a change request of a slide angle is displayed in the edit menu 1260 that is connected to the hold slide trigger 1251 by a straight line, and a tap trigger (starting point tap trigger) for receiving a change request into a hold trigger is also selectably displayed in the edit menu 1260.

When the edit menu display screen is displayed, the control section 11 determines whether a selection operation to the edit menu is received or not (Step S206). Here, in a case where it is determined that a selection operation to the edit menu is received ("Yes" at Step S206), the control section 11 edits the trigger for which selection is received in accordance with the selection operation (in the present embodiment, changes the type of the trigger or deletes the trigger); updates the music score information so that the edited content is reflected thereto; and registers the updated music score information in the music score information storage section 12c (Step S207).

When the music score information is updated, the control section 11 causes the display section 13 to display the music score editing screen on the basis of the updated music score information (Step S208); terminates the processing herein; and shifts to the process at Step S104 in the edit mode processing (see FIG. 6).

On the other hand, in a case where it is determined that no selection operation to the edit menu is received ("No" at Step S206), the control section 11 determines whether a request to change arrangement of the trigger (trigger arrangement changing request) is received or not (Step S209). In a case where it is determined that a trigger arrangement changing request is received, for example, by receiving a drag operation as the trigger arrangement changing operation ("Yes" at Step S209), the control section 11 updates the music score information so that an arrangement position of the trigger is changed in accordance with the trigger arrangement changing request (Step S207). In this regard, in the present embodiment, in a case where the arrangement changing request position of the trigger, which is indicated by a drag operation received as a trigger arrangement changing request (that is, a position at which the drag operation is terminated) is an arrangement permissible position at which a trigger arrangement permissible mark is arranged, the control section 11 changes the arrangement position of the trigger in accordance with the trigger arrangement changing request. On the other hand, in a case where it is determined that no trigger arrangement changing request is received ("No" at Step S209), the control section 11 determines whether the trigger editing processing is to be terminated or not (Step S210). Here, in a case where it is determined that the trigger editing processing is not to be terminated ("No" at Step S210), the control section 11 causes the processing flow to proceed to the process at Step S205.

On the other hand, in a case where it is determined that the trigger editing processing is to be terminated, for example, because a predetermined trigger editing processing terminates operation is received, the control section 11 terminates the processing herein, and causes the processing flow to proceed to the process at Step S104 in the edit mode processing (see FIG. 6).

Further, in a case where it is determined that selection of the trigger is not received in the process before the trigger editing processing in the edit mode processing is started (that is, the process at Step S105) ("No" at Step S105), the control section 11 determines whether an enlarging request for the music score is received or not (Step S106). Here, in a case where it is determined that no enlarging request for the music score is received ("No" at Step S106), the control section 11 causes the processing flow to proceed to the process at Step S104.

On the other hand, in a case where it is determined that an enlarging request for the music score is received, for example, by receiving a predetermined music score enlarging operation (for example, a pinch-out operation) by the player ("Yes" at Step S106), the control section 11 causes the display section 13 to display the music score editing screen in which the music score is enlarged (Step S107), and causes the processing flow to proceed to the process at Step S102.

Figure 13A:
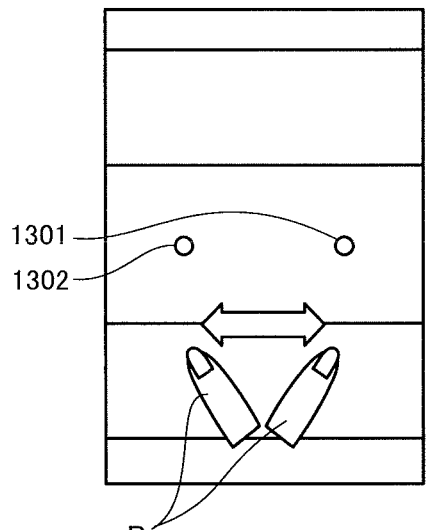
FIGS. 13A and 13B are explanatory drawings for explaining enlargement of the music score.
Figure 13B:
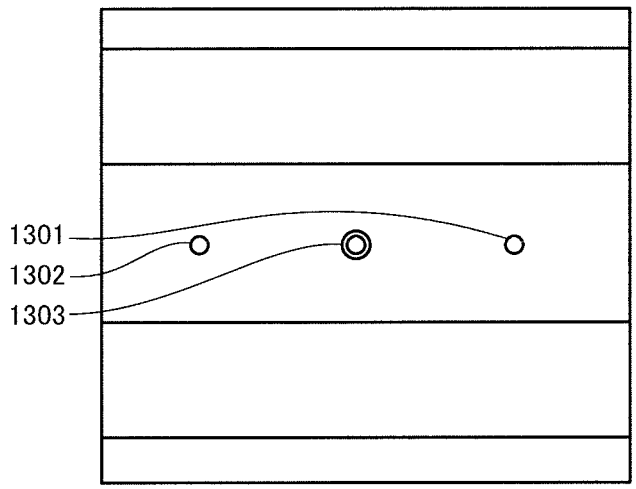

FIGS. 13A and 13B are explanatory drawings for explaining enlargement of the music score. When a pinch-out operation by the finger P of the player (that is, an operation to touch two points of the display screen by means of two fingers of the player and to move touched points so that a distance between the two points is extended) is received toward a part of the display screen as shown in FIG. 13A, the control section 11 updates the music score editing screen so that a distance between two trigger arrangement permissible marks 1301, 1302 on the lane is extended as shown in FIG. 13B. In this regard, in the present embodiment, even though the music score is enlarged, a size of the trigger is not changed. Further, the control section 11 causes the display section 13 to selectively display the trigger arrangement permissible marks in accordance with the size of the music score (or an enlargement ratio). Namely, in a case where the music score is enlarged from the state shown in FIG. 13A to the state shown in FIG. 13B, for example, the control section 11 causes the display section 13 to display one trigger arrangement permissible mark 1303 between the two rigger arrangement permissible marks 1301, 1302, which have been displayed before the enlargement so as to be added on the basis of the trigger arrangement permissible mark information corresponding to the displayed music score.

In this regard, in a case where the control section 11 receives a pinch-in operation, the control section 11 causes the display section 13 to display the music score so as to be reduced (or scale down). Further, in a case where a predetermined operation (for example, a double tap to the display screen) is received, the control section 11 resets a scale of the music score.

As explained above, in the embodiment described above, the rhythm game control apparatus 100 for controlling progress of a rhythm game while reproducing music and causing a display device to display one or more trigger, which indicates an operation sign to prompt a player to input an operation according to a rhythm of the music, on a display screen of the display device with a touch panel is configured so as to: include the basic music score information storage section 12b for storing basic music score information, the basic music score information indicating a basic music score on which one or more trigger arrangement permissible mark is arranged, the trigger arrangement permissible mark indicating an arrangement permissible position for the one or more trigger; include the music score information storage section 12c for storing music score information, the music score information indicating a music score on which the one or more trigger is arranged, the music score being used in the rhythm game; cause the display device 13 to display the music score editing screen on which the basic music score indicated by the basic music score information can be edited (for example, Step S101); receive a trigger arranging request from the player on the music score editing screen on the basis of a trigger arranging operation by the player (for example, Step S102); arrange each of the one or more trigger on the basic music score in accordance with the trigger arranging request received by the trigger arranging request receiver in a case where an arranging request position of each trigger by the trigger arranging request is an arrangement permissible position at which a trigger arrangement permissible mark is arranged (for example, Step S103); and register the music score information in the music score information memory, the music score information indicating the music score for which the trigger arranger arranges the one or more trigger on the basic music score and the basic music score is thereby edited (for example, Step S103). Therefore, it is possible to cause a player to create a variety of music scores in a rhythm game. As a result, it is possible to satisfy needs of a player who utilizes a variety of music scores.

Namely, the player associates the trigger with the music score, whereby it is possible to create a variety of music scores. Therefore, this becomes possible to utilize the variety of music scores other than the music scores created at a game provider side in the rhythm game.

Further, in the embodiment described above, the rhythm game control apparatus 100 may be configured so as to: cause the display device 13 to display the music score editing screen on which the music score indicated by the music score information registered in the music score information storage section 12c can be edited (for example, Step S101); arrange a trigger on the music score in response to the trigger arranging request in a case where the arranging request position of the trigger by the trigger arranging request is an arrangement permissible position at which a trigger arrangement permissible mark is arranged (for example, Step S103); and register the music score information, which indicates the music score edited so that the trigger arranger arranges the trigger on the music score, in the music score information storage section 12c (for example, Step S103). Therefore, by arranging the trigger arrangement permissible marks at positions matched with a tempo or a rhythm of music (or song), it is possible to create the music score according to the music (or the song) regardless of a technique of the player.

Further, in the embodiment described above, the rhythm game control apparatus 100 may be configured so as to: receive a trigger arrangement changing request on the music score editing screen by a trigger arrangement changing operation of the player (for example, Step S209); change the arrangement position of the trigger in accordance with the trigger arrangement changing request in a case where the arrangement changing request position of the trigger by the trigger arrangement changing request is another arrangement permissible position at which another trigger arrangement permissible mark is arranged (for example, Step S207); and register the music score information, which indicates the music score edited so that the trigger arrangement position changer changes the arrangement position of the trigger, in the music score information storage section 12c (for example, Step S207). Therefore, it becomes possible to prevent the position of the trigger from being set up at a position out of accordance with the music (or song).

Further, in the embodiment described above, the rhythm game control apparatus 100 may be configured so as to selectively display the one or more trigger arrangement permissible mark on the basis of a size of the music score editing screen to be displayed on the display screen. Therefore, it becomes possible to improve operability of the music score editing screen on which the triggers are arranged. Further, since positions at which the triggers can be arranged are gradually segmentalized by continuing the enlargement, it is possible to arrange the triggers by a frame unit. By making full use of this function, it is possible to arrange the triggers at places outside the rhythm of the music. Further, by configuring the rhythm game control apparatus 100 in this manner, it is possible to create an anomalous music score or a more technical music score.

Further, although it has not been mentioned particularly in the embodiment described above, the rhythm game control apparatus 100 may be configured so as to transmit part or all of the music score information stored in the music score information storage section 12c to other apparatus via the communication network. By configuring the rhythm game control apparatus 100 in this manner, it is possible to transfer the music scores between players of the same video game, and this makes it possible to improve sociability of the video game itself.

In this regard, in the embodiment described above, the rhythm game control apparatus 100 is configured so as to carry out various kinds of processings such as the edit mode processing described above on the basis of the video game program read out from the game cartridge 20. However, the rhythm game control apparatus 100 may be configured so as to acquire the video game program via the communication network such as the Internet. Further, the rhythm game control apparatus 100 may be configured so as to function as a video game server to provide the video game program to a video game terminal via the communication network.

Further, in the embodiment described above, the rhythm game control apparatus 100 carries out the various kinds of processes described above in accordance with various kinds of control programs (for example, rhythm game processing program) stored in a storage device (the storage section 12) with which the rhythm game control apparatus 100 itself is provided.

INDUSTRIAL APPLICABILITY

The present invention is useful to cause a player to create a variety of music scores in a rhythm game.

What is claimed is:

1. A rhythm game control apparatus for controlling progress of a rhythm game while reproducing music and causing a display to display one or more trigger on a display screen of the display, the display including a touch panel, each of the one or more trigger indicating an operation sign to prompt a player to input an operation according to a rhythm of the music, the rhythm game control apparatus comprising:
a basic music score information memory for storing basic music score information, the basic music score information indicating a basic music score on which one or more trigger arrangement permissible mark is arranged, the trigger arrangement permissible mark indicating an arrangement permissible position for the one or more trigger;
a music score information memory for storing music score information, the music score information indicating a music score on which the one or more trigger is arranged in a game mode, the music score being used in the rhythm game;
a processor for causing the display to display a music score editing screen on which the basic music score indicated by the basic music score information is configured to be edited in an edit mode; and
a receiver for receiving a trigger arranging request from the player on the music score editing screen in the edit mode on the basis of a trigger arranging operation by the player,
wherein the processor arranges each of the one or more trigger on the basic music score in accordance with the trigger arranging request received by the receiver in the edit mode in a case where an arranging request position of each trigger by the trigger arranging request is an arrangement permissible position at which a trigger arrangement permissible mark is arranged,
the processor registers edited music score information in the music score information memory, the edited music score information indicating the music score for which the one or more trigger on the basic music score is edited in the edit mode, and
a special effect is activated within a certain range on the music score when the player continues the operation at the right time during progress of the game mode, the certain range not being the arrangement permissible position in the edit mode.

2. The rhythm game control apparatus according to claim 1, wherein
the receiver is further for receiving a trigger arrangement changing request on the music score editing screen in the edit mode by a trigger arrangement changing operation of the player,
the processor changes the arranging request position of each trigger in accordance with the trigger arrangement changing request received by the receiver in the edit mode in a case where the arrangement changing request position is another arrangement permissible position at which another trigger arrangement permissible mark is arranged, and
the processor registers changed music score information, which indicates the music score for which the arrangement position of the trigger is changed in the edit mode, in the music score information memory.

3. The rhythm game control apparatus according to claim 1, wherein the processor causes the display to selectively display the one or more trigger arrangement permissible mark on the basis of a size of the music score editing screen to be displayed on the display screen.

4. A non-transitory computer-readable medium including a rhythm game control program for causing a computer to control progress of a rhythm game while reproducing music and causing a display to display one or more trigger on a display screen of the display, the display including a touch panel, each of the one or more trigger indicating an operation sign to prompt a player to input an operation according to a rhythm of the music,
wherein the computer comprises:
a basic music score information memory for storing basic music score information, the basic music score information indicating a basic music score on which one or more trigger arrangement permissible mark is arranged, the trigger arrangement permissible mark indicating an arrangement permissible position for the one or more trigger; and
a music score information memory for storing music score information, the music score information indicating a music score on which the one or more trigger is arranged in a game mode, the music score being used in the rhythm game, and
wherein the rhythm game control program causes the computer to execute:
causing the display to display a music score editing screen on which the basic music score indicated by the basic music score information is configured to be edited in an edit mode;
receiving a trigger arranging request from the player on the music score editing screen in the edit mode on the basis of a trigger arranging operation by the player;

arranging each of the one or more trigger on the basic music score in accordance with the trigger arranging request received in the receiving of the trigger arranging request in the edit mode in a case where an arranging request position of each trigger by the trigger arranging request is an arrangement permissible position at which a trigger arrangement permissible mark is arranged; and registering edited music score information in the music score information memory, the edited music score information indicating the music score for which the one or more trigger is arranged on the basic music score is edited in the edit mode, wherein a special effect is activated within a certain range on the music score when the player continues the operation at the right time during progress of the game mode, the certain range not being the arrangement permissible position in the edit mode.

\* \* \* \* \*